US012686088B2

(12) United States Patent
Fries et al.

(10) Patent No.: US 12,686,088 B2
(45) Date of Patent: Jul. 21, 2026

(54) FORMING MACHINE WITH A PLURALITY OF WORKSTATIONS

(71) Applicant: WAFIOS Aktiengesellschaft, Reutlingen (DE)

(72) Inventors: Stefan Fries, Reutlingen (DE); Bernd Walz, Pfullingen (DE)

(73) Assignee: WAFIOS Aktiengesellschaft, Reutlingen (DE)

( * ) Notice: Subject to any disclaimer, the term of this patent is extended or adjusted under 35 U.S.C. 154(b) by 551 days.

(21) Appl. No.: 18/211,825

(22) Filed: Jun. 20, 2023

(65) Prior Publication Data

US 2023/0405744 A1 Dec. 21, 2023

(30) Foreign Application Priority Data

Jun. 20, 2022 (DE) .......................... 102022206118.7

(51) Int. Cl.
| | |
|---|---|
| B23P 23/02 | (2006.01) |
| B21D 7/00 | (2006.01) |
| B21D 43/00 | (2006.01) |

(52) U.S. Cl.
CPC ................ B23P 23/02 (2013.01); B21D 7/00 (2013.01); B21D 43/006 (2013.01)

(58) Field of Classification Search
CPC ......... B23P 23/02; B21D 7/00; B21D 43/006; B21D 7/12; B21D 11/10; B21D 43/105; B21D 43/05; B21F 1/006; B21F 1/023; B21F 1/026; B21F 23/005; B21H 3/04; B21H 3/06; B21K 27/04
See application file for complete search history.

(56) References Cited

U.S. PATENT DOCUMENTS

| | | | | |
|---|---|---|---|---|
| 5,584,205 A | * | 12/1996 | Harsch ................. | B21D 43/055 |
| | | | | 72/405.13 |
| 2001/0014279 A1 | * | 8/2001 | Harsch ................... | B21D 43/05 |
| | | | | 414/749.1 |
| 2005/0145003 A1 | | 7/2005 | Burton et al. | |

(Continued)

FOREIGN PATENT DOCUMENTS

| | | | | |
|---|---|---|---|---|
| DE | 3028833 A1 | | 2/1982 | |
| DE | 4300311 A1 | * | 7/1994 | ................ B21F 1/00 |

(Continued)

OTHER PUBLICATIONS

Extended European Search Report dated Nov. 15, 2023, of counterpart European Patent Application No. 23179377.9, along with an English machine translation.

(Continued)

*Primary Examiner* — Lee A Holly
(74) *Attorney, Agent, or Firm* — DLA Piper LLP (US)

(57) ABSTRACT

A forming machine that produces formed parts of a complex design from straight workpieces from wire or tube includes a computerized numerical control unit; a plurality of workstations including a loading station, a first machining station downstream of the loading station, and at least one second machining station downstream of the first machining station, wherein at least two of the machining stations are forming stations; and a transport system that transports successive workpieces from the loading station to downstream workstations while under control by the control unit.

12 Claims, 5 Drawing Sheets

(56)      References Cited

U.S. PATENT DOCUMENTS

| 2021/0162483 A1 | 6/2021 | Bauersachs |
| 2023/0372991 A1 | 11/2023 | Weigmann et al. |

FOREIGN PATENT DOCUMENTS

| DE | 102019103768 A1 | 8/2019 |
| EP | 0 672 480 A1 | 9/1995 |
| EP | 1 123 761 A2 | 8/2001 |
| WO | 2022/073786 A1 | 4/2022 |

OTHER PUBLICATIONS

Firma Schmale Maschinenbau GmbH "X2000NC".

* cited by examiner

FORMING MACHINE WITH A PLURALITY OF WORKSTATIONS

TECHNICAL FIELD

This disclosure relates to a forming machine that produces formed parts of a complex design from straight workpieces of wire or tube, and a forming plant comprising such a forming machine.

BACKGROUND

A computerized numerically controlled forming machine of the type has a plurality of workstations. The workstations include a loading station by way of which the forming machine can be loaded with the usually straight workpieces to be processed, and a first machining station downstream of the loading station, and at least one second machining station downstream of this first machining station. A machining station is a workstation in which the workpiece is machined and as a result is altered in terms of its properties, in particular in terms of its shape or design. At least two of the machining stations are conceived as forming stations at which the workpiece is formed by bending or pressing, for example. While under control by a control unit, a plurality of forming operations are implemented by the forming machine; other machining operations such as subtractive machining, for example, may also be additionally provided.

The workpieces to be processed run through the workstations in succession. To this end, the forming machine has a transport system that transports successive workpieces from the loading station to the downstream workstations. The transport system operates while under control by the control unit. Such multi-station forming machines are typically used when large volumes of formed parts, optionally of a complex design, are to be produced in a short time.

A formed part is typically largely or exclusively a semi-finished product or final product composed of metal and produced to emanate from a blank, wherein the original design or shape of the blank is altered in a targeted manner by machining during the production process. The machining here comprises forming operations that alter the design substantially without subtracting material such as bending, pressing or embossing, for example. Other machining operations may additionally be provided, in particular subtractive machining operations such as stamping, punching, tapping, milling, chamfering and/or planing, for example.

US 2005/145003A1 describes a computerized numerically controlled bending system having several bending stations each equipped with a bending head. The workpieces are transported from one bending station to the next with the aid of grippers. The grippers are suspended from a gantry with two axes and grip the workpiece preferably in a central region. Each bending head grips the tube at a different intermediate position. Preferably, each bending station is capable of positioning the bending head such that the free end of the workpiece to be bent can be aligned in the bending plane without being compromised by an adjacent bending station.

Schmale Maschinenbau GmbH offers the type "X2000NC" wire bending machine operated in a purely servo-electrical manner and by virtue of a modular construction having an operating wall and operating units that can be assembled on the latter permits variable tooling with the most different apparatuses to implement even complex forming processes. Many required forming processes can be implemented using bending slides, stamping presses, compressing presses and embossing presses. A linear transfer which simultaneously serves the different forming stations and, as a result, is said to be substantially faster than usual CNC wire bending machines is provided for transporting workpieces from one workstation to the other workstation.

Furthermore, there is seen to be demand for forming machines that can operate at a high piece rate, on the one hand, and offer the user great flexibility in terms of the multi-stage processes that can be implemented therewith, on the other hand.

It could therefore be helpful to provide a forming machine capable of manufacturing formed parts of a complex design at a high output rate, and on the other hand offers the user high flexibility in terms of implementing different multi-stage forming processes in a cost-effective manner.

SUMMARY

We provide a forming machine that produces formed parts of a complex design from straight workpieces from wire or tube, including a computerized numerical control unit; a plurality of workstations comprising a loading station, a first machining station downstream of the loading station, and at least one second machining station downstream of the first machining station, wherein at least two of the machining stations are forming stations; a transport system that transports successive workpieces from the loading station to downstream workstations while under control by the control unit, wherein the transport system is of a modular construction and comprises a plurality of transport modules, and each of the transport modules is assigned to two mutually successive workstations and includes a support structure; a transport unit supported by the support structure, and while under control by the control unit by way of an individual motion profile in a shuttle operation is movable in a reciprocating manner along a module transport section of the transport module, between a first terminal position and a second terminal position of a reciprocating stroke; and a gripper unit that grips a workpiece.

We also provide a forming plant that produces complexly bent formed parts from wire or tube, including an installation that provides straight workpieces of definable length from wire material or tubular material; and the forming machine that produces formed parts of a complex design from straight workpieces from wire or tube, including a computerized numerical control unit; a plurality of workstations comprising a loading station, a first machining station downstream of the loading station, and at least one second machining station downstream of the first machining station, wherein at least two of the machining stations are forming stations; a transport system that transports successive workpieces from the loading station to downstream workstations while under control by the control unit, wherein the transport system is of a modular construction and comprises a plurality of transport modules, and each of the transport modules is assigned to two mutually successive workstations and includes a support structure; a transport unit supported by the support structure, and while under control by the control unit by way of an individual motion profile in a shuttle operation is movable in a reciprocating manner along a module transport section of the transport module, between a first terminal position and a second terminal position of a reciprocating stroke; and a gripper unit that grips a workpiece, downstream of the installation, that produces complexly bent formed parts from the straight workpieces.

BRIEF DESCRIPTION OF THE DRAWINGS

Further advantages are derived from the description of examples of our machines and systems discussed hereunder by the figures.

DETAILED DESCRIPTION

Figure 1:
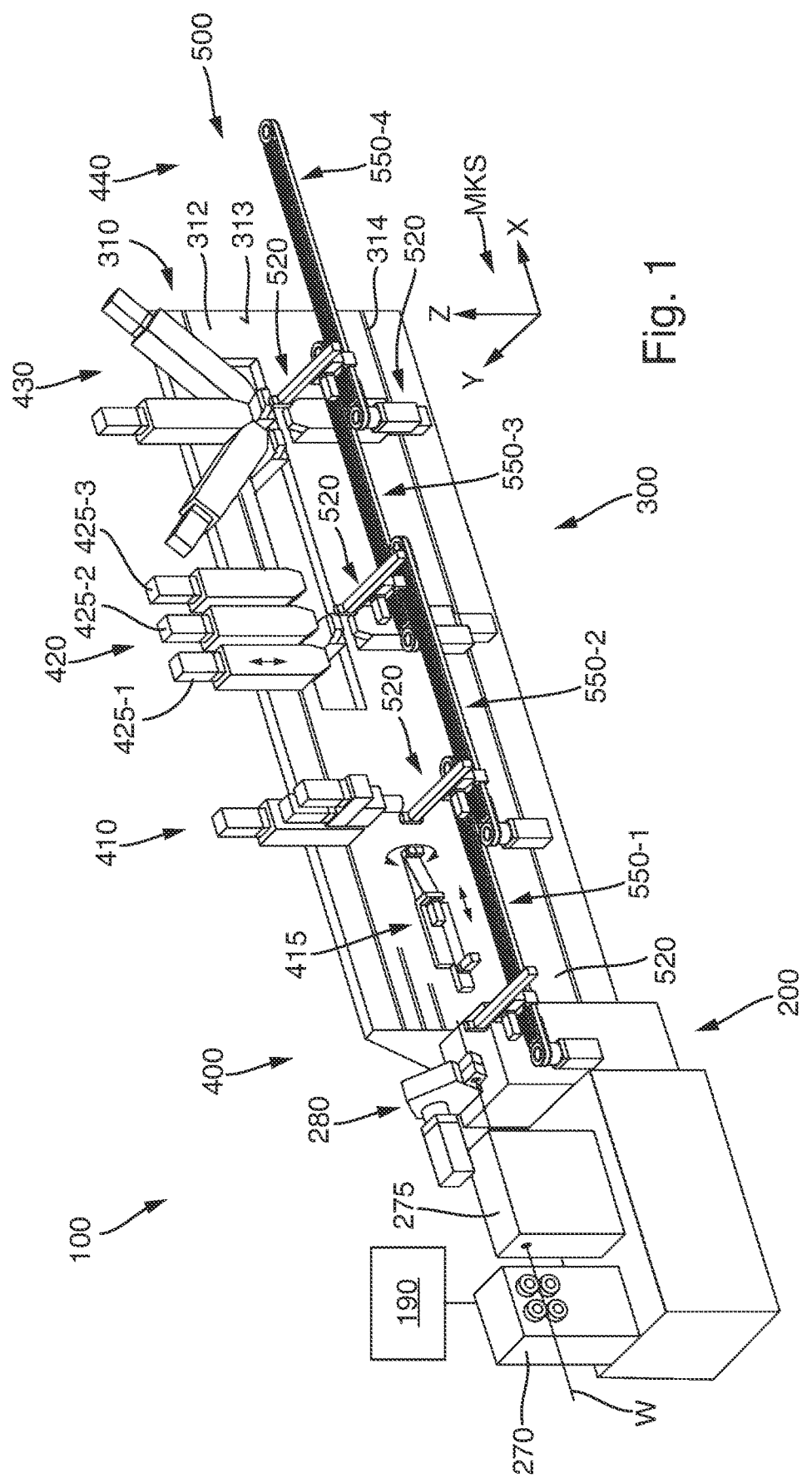
FIG. 1 shows a schematic, oblique perspective view of a forming plant that produces complexly bent formed parts from wire or tube, according to an example.

According to one interpretation, our forming machine in comparison to those known in the art is distinguished by characteristics in terms of the basic design of the transport system. Our transport system is of a modular construction. Our transport system comprises a plurality of transport modules, thus two, three, four or more, transport modules. Each of the transport modules is assigned to at least two successive workstations, or workstations disposed behind one another. A transport module comprises a support structure and a transport unit which is supported by the support structure. The transport unit while under control by the control unit can be moved in a reciprocating manner individually, i.e., by way of an individual motion profile, in a shuttle operation along a module transport section of the transport module, between a first terminal position and a second terminal position of the reciprocating movement. A transport unit has a (controllable) gripper unit for gripping a workpiece.

A gripper unit functions as a workpiece receptacle unit for receiving and releasing in a controllable manner a workpiece. In many configurations, the gripper unit is configured as a mechanical gripper unit that mechanically grips a workpiece. To this end, the gripper unit is equipped with at least one movable part that can be activated electrically or pneumatically, for example. The workpiece can be gripped and firmly held by clamping, for example. A gripper unit can also be configured as a magnetic gripper unit that optionally requires no mechanically movable parts. Magnetic forces are utilized to receive and firmly hold ferromagnetic workpieces. A magnetic gripper unit can have an electrically actuatable solenoid which in the energized state firmly holds a workpiece on the gripper unit and releases the workpiece when non-energized.

A transport module is a functional group able to be assembled separately and of which the components for constructing or upgrading the forming machine can be conjointly installed and specified, and permits the overall system to be upgraded in a simple manner when required.

The modular construction of the transport system offers a user significant advantages compared to conventional transfer systems.

On the one hand, the transport system becomes very easily scalable by virtue of the modular construction, wherein correspondingly fewer transport modules are required for a forming machine with few machining stations, and subsequent upgrading of the forming machine is optionally possible rapidly and inexpensively and with a perfect fit by retrofitting (one or a plurality of) further transport modules.

A transport system of a modular construction also offers advantages in terms of dynamics and as a result also in terms of the short cycle times that can be achieved. In known forming machines such as "X2000NC" mentioned above, all gripper units are assembled on a common support rail. The latter is supported by a common support movable in a reciprocating manner parallel to the transport direction and moved in a reciprocating manner by a drive of a correspondingly strong basic design, and which supports two further drives that, in a manner coordinated with the reciprocating movement of the support, can effect a transverse stroke of the rails supporting the transport unit in the direction of the machining units and back. Significant masses thus each have to be moved, whereas the masses in individual transport units are significantly less so that higher accelerations and thus shorter cycle times are able to be achieved.

A further advantage results in terms of the flexibility of the construction. Each of the transport modules defines a module transport section, the length thereof between a first and a second end being defined by the construction. This module transport section can be completely utilized for the reciprocating movement so that the first terminal position and the second terminal position of the reciprocating movement lie at the respective ends of the module transport section. However, the complete module transport section does not have to be used for a reciprocating movement. Reciprocating movements with a smaller reciprocating stroke are also possible so that the first terminal position can lie at a spacing from the first end of the module transport section, and/or the second terminal position of the reciprocating movement can lie at a spacing from the second end of the module transport section, for example. Thus it can be achieved as a result that the machining units on the workstations to be connected do not have to be attached at an exact mutual spacing. Rather, as a result of the control, the reciprocating stroke, thus the spacing between the first and the second terminal position of the reciprocating movement, along the module transport section, in terms of control technology can be adapted to the spacings between the workstations at any time. As a result, much time can be saved during set-up, because work units do not have to be installed in an entirely precise manner at a specific pitch.

A transport module for moving the transport unit along the transport section may have a module-specific drive system having a transport drive supported by the support structure and actuatable by the control unit. The components of the drive system can thus be preassembled conjointly with the associated transport drive and be installed and uninstalled as a component part of the transport module.

Preferably, a transport unit has a basic carrier movable along the module transport section and supporting a gripper arm that is transversely displaceable, in particular perpendicularly, to the module transport section and supports a gripper unit assembled at the end of the gripper arm, wherein the basic carrier supports a drive which for moving the gripper arm is actuatable by the control unit. The drive for the gripper arm is thus a drive that travels conjointly with the transport unit so that this functionality is also integrated in the transport unit.

Each transport module can thus have two individually controllable drives, specifically one for the reciprocating stroke in the primary transport direction, and one for the transverse stroke which is preferably oriented to be perpendicular to the reciprocating stroke. In this way, the reciprocating stroke can be programmed with a variably definable stroke length and a variably definable motion profile, the same applying in an analogous manner to the transverse stroke.

A workpiece holding device that receives a workpiece at the corresponding machining station is preferably provided on at least one machining station, for example, at least on one or on each of the bending stations. The workpiece holding device can hold the workpiece to be machined in a machining position, or move the workpiece to this position, respectively, in which position the workpiece with the aid of tools of a machining unit of the machining station is then formed or machined in another way. A workpiece receptacle unit configured as a gripper unit is preferably configured and suitable to load the workpiece into such a workpiece holding device and unload the workpiece from the latter.

At least in one of the transport units, optionally also in two or more of the transport units, or in all transport units, the gripper unit may be mounted on the gripper arm to be rotatable about a gripper unit rotation axis, and/or in that in at least one of the transport units the gripper unit is height adjustable in relation to the basic carrier. The gripper unit rotation axis preferably runs parallel to the translatory axis of the gripper arm. A further degree of freedom in the positioning of the workpiece at a workstation, or in terms of the workpiece holding device of the workstation, respectively, is provided by this additional functionality. In this way it is optionally possible to design the workpiece holding devices in a simpler manner than in conventional systems in that integrated rotation axes in the workpiece holding device are dispensed with. Alternatively or additionally, a linear movement of the gripper unit in the z-direction, thus in the vertical direction, is also possible. Such a height adjustment can be implemented by pneumatics or servomotors, for example.

The transport modules may be disposed in a plurality of rows, in particular in two rows, to be offset behind one another such that the module transport sections of directly successive transport modules on one workstation overlap in an overlap region. It can be achieved as a result that the transport unit of one of the transport modules can bring the workpiece to the workstation and transfer the workpiece, and the transport unit of the adjacent transport module can receive the workpiece at the same location and transport the workpiece onward when required.

The transport system of a forming machine may comprise a plurality of transport modules constructed and sized to be substantially mutually identical. In particular, all transport models of the transport system can be constructed with a uniform length, thus with a uniform module transport section and/or with a uniform transport drive system. The construction using nominally identical functional groups is mirrored in favorable production costs for a transport system because economies of scale can be utilized. Nevertheless, the flexibility is maintained without restrictions because the entire available module transport section does not have to be utilized for the reciprocating stroke in each of the transport modules. This is because a transport module fundamentally permits not only a reciprocating operation between the ends of the module transport section. Instead, a transport module can also be used or actuated such that a reciprocating operation takes place only over a shorter sub-section. It is thus not necessary to utilize the maximum module transport section made possible by the construction of the latter. The flexibility in the distribution of the module transport sections of the transport system can be utilized to render the overall construction more flexible.

However, it is also possible that transport modules of different basic designs are combined. In particular, transport modules with module transport sections of different lengths can be combined.

Alternatively or additionally, it is also possible to position the transport modules relative to one another such that overlap regions of different lengths exist between different transport modules.

In many examples, the workstations of the forming machine are distributed at a uniform pitch meaning that the spacing of the machining positions at adjacent machining stations is each of identical size. However, it is also possible that the machining stations are disposed at an irregular pitch so that the spacings between successive workstations measured along the global transport section may be of different sizes. In this way, the available installation space can be utilized to attach machining units so that also machines that enable very many forming stages and machining stages, optionally of various complexity, can still be constructed with compact dimensions.

Since each transport module has a dedicated transport unit controllable by an individual motion profile, very individual combinations of transport sections can also be readily implemented. The operating movements of the transport unit of one transport module can significantly differ from the operating movements of one of the other transport modules over time. It can thus arise that one transport unit at a workstation moves in phases to implement the machining process provided there, for example, for repositioning the workpiece, while the transport units on one or a plurality of other transport modules are stationary or are controlled according to another motion profile.

FIG. 1 shows a schematic, obliquely perspective view of a forming plant 100 that produces formed parts of a complex design from wire or tube, according to an example. This is a computerized numerically controlled multi-station forming plant on which formed parts of a complex design can be produced largely by forming and optionally be also additionally modified by other machining operations. The computerized numerical control unit 190 that controls all components connected thereto can be accommodated in a switch box, for example.

The metallic initial material W (wire or tube) is present in the form of a coiled material supply not illustrated. The forming plant comprises a converting machine 200 that produces straightened workpieces WS of definable length from the initially still curved initial material, and a forming machine 300 downstream of the converting machine 200 and produces complexly bent formed parts, and/or formed parts which in terms of their design have been altered in a targeted manner in another way, from the straight workpieces.

The converting machine has an infeed installation 270 that feeds workpiece material from the coiled material supply; a straightening installation 275 that straightens the workpiece material W, and a downstream cutting installation 280 that severs straightened workpiece portions WS from the supplied workpiece material.

In another example, the infeed installation is disposed behind the straightening unit in the direction of the flow of material. When a roller straightener is used as a straightening unit, the former is usually disposed between the reel and the infeed installation, while the sequence shown (with the straightening unit between the infeed and the cutting installation) is chosen for a straightening unit with a rotating flyer (rotating straightening).

The transfer of the severed straight workpieces to the downstream forming machine 300 takes place directly at the cutting installation 280. This is where the loading station 400 of the forming machine is located.

The forming machine 300 has a torsionally stiff machine frame 310 comprising a vertical assembly wall 312, the vertical front side 313 of the latter lying parallel to the x-z-plane of the machine coordinate system MKS. The horizontal y-direction runs perpendicularly to the front side 313. Assembly structures, which can be flexibly utilized and have a multiplicity of horizontal assembly grooves 314 disposed at a spacing above one another and have a T-profile, are configured on the front side. These assembly structures permit components of the forming machine to be attached at any arbitrary position in the x-direction, in particular the components of tool-supporting machining units intended to form the workstations of the multi-station forming machine. Assembly bores and other structures that fasten components may be present in addition to the horizontal assembly grooves. The horizontal x-direction is also referred to as the longitudinal direction; and the horizontal y-direction is also referred to as the transverse direction, and the z-direction is also referred to as the vertical direction.

The forming machine 300 in the stage of expansion illustrated has four workstations, specifically the loading station 400, which is at the cutting installation 280, and three forming stations which are successive in a horizontal row, specifically a first forming station 410, a second forming station 420, and a third forming station 430.

The first forming station 410 is configured as a bending station that bends the workpiece by finger bending, or pin-and-mandrel bending, and to this end has a bending head with a vertically oriented bending head axis. The bending head has a bending tool rotatable about the bending head axis and has a bending pin disposed eccentrically in relation to the bending head axis and is able to be rotated about a central tool part having bending mandrels of different diameters attached thereto.

A manipulator 415 is attached on the assembly wall 312 between the loading station 400 and the first forming station 410, the manipulator 415 having a gripper which by a dedicated drive of the manipulator is rotatable about a rotation axis running in the x-direction and permits the workpiece to be gripped at the first workstation and to rotate the workpiece about a horizontal axis, for example, to change the bending plane.

The manipulator 415 can be displaced in the x-direction (double arrow) so that bends can be applied to different locations of the workpiece, or so that material can be supplied during bending, which is expedient for rotary draw bending, for example. In this way, bending, eccentric bending and coiling, are possible at the bending station, for example.

The second forming station 420 is equipped with three bending units 425-1, 425-2, 425-3 co-aligned in parallel and have linearly displaceable bending slides, the latter permitting the incoming workpieces, which have already been bent, to be bent by bending slides. Attached to the third forming station 430 are three bending slides which are mutually disposed at angles. Counter tools, that are actuatable from below and serve as counter elements of the resultant shape, are additionally attached to the workstations. The bending slides of the individual workstations can be variably displaced. For example, the bending slides can be displaced to be coupled to one another or separately from one another, and thereby be operated in a manner in which they are controlled in terms of force, position, or travel.

In addition to two or more forming stations, other machining stations and/or other workstations may also be provided. For example, a portion having a thread, flutes, knurls or similar may have to be produced on the formed part to be generated. The generation of a thread can take place, for example, using a flat die roller that can be disposed between the cutting device 280 and the first forming operation at the first forming station 410, for example. Producing a thread by a flanging head can be provided at the end of the operation, thus after the third forming unit 430. If required, subtractive machining can also be performed on the severed workpiece, for example, by chamfering, planing, or sharpening. A corresponding subtractive machining station can be disposed between the cutting device 280 and the first forming station 410, for example, so that the subtractive machining can be carried out on the still straight workpiece. If required, at least one workstation can have a CNC press, for example, to generate a flattened portion on a formed part made from round stock. A measuring station can also be provided, for example, to optically determine the geometry of the measured formed part by a camera and image processing.

To transfer or transport the workpieces between the workstations, the forming machine has a transport system 500. The latter is of a modular construction and in the example illustrated comprises four transport modules 550-1, 550-2, 550-3 and 550-4. Each of the transport modules is a separately preassembled functional group.

There are various possibilities for assembling the transport modules. For example, the transport modules can be fastened to the front side of the assembly wall 312 by a supporting console.

However, the transport modules can also be assembled independently of the assembly wall 310. For example, the transport modules can be fastened to the floor or to a basic carrier not suspended on the assembly wall or connected to the latter. Components of a support construction 555 which supports the horizontal support structure of the first transport module and is at a spacing from the assembly wall is illustrated by dashed lines below the elongate support structure of the first transport module 550-1 in FIG. 2. The supporting feat 557 are height adjustable. As a result, the transport module, or the support structure thereof, can be lowered, as a result of which free access to the assembly wall and for equipping the tools becomes possible. A corresponding height adjustment is provided in each of the transport modules here.

All transport modules are of a nominally identical or largely identical construction and conjointly ensure a successive transfer of successive workpieces from the loading station 400 to all three downstream machining stations, and thereafter to a dispatch 440. This primary transport direction runs in the x-direction. The transport system 500 is illustrated in greater detail and in fragments in FIG. 2, and in a plan view from above in FIG. 3.

The first transport module 550-1 is provided to transport severed straight workpieces between the loading station 400, or the cutting installation 280, and the first machining station 410. The second transport module 550-2 ensures transport between the first forming station 410 and the second forming station 420. The third transport module 550-3 at the second forming station 420 receives the workpiece machined on the latter and transports the workpiece to the third forming station 430. The fourth transport module 550-4 is responsible for the dispatch, for example, for the transport from the third and last bending station to a transfer station not illustrated.

Using the example of the second transport module 550-2, the construction of the latter will be explained in more detail (cf. FIG. 2). A transport module has a narrow support structure 510 that is horizontally elongate in the x-direction, the length thereof measured in the x-direction potentially being more than 10 times or more than 15 times the width of the support structure 510 measured in the y-direction, for example. At the same time, the length is only a fraction of the overall length of the transport system between the loading station 400 and the delivery, for example, less than 50%, for example, between 10% and 40% (depending on the number of transport modules in the entire transport section). The support structure, by way of the console not illustrated, can be fastened at a specific spacing from the front side 313 of the assembly wall 312, or be free-standing.

Each support structure supports a single transport unit 520 which by a slide 521 is guided to be displaceable in the x-direction on two guide rails attached to the upper side of the support structure. A module-specific drive system comprising a transport drive 530, the latter in the example being configured as a servo motor with a vertical rotation axis and being assembled at one end of the support structure, is provided to move the transport unit 520 in the x-direction (primary transport direction). The servo motor drives a horizontally revolving timing belt 524 which in the axial end regions of the support structure is guided over deflection rollers. The slide is fastened to the timing belt and with the aid of the transport drive 530 can be moved in a shuttle operation in a reciprocating manner between a first end 521-1, which is closest to the transport drive 530, and a second end 521-2, which is farthest from the latter. The section between the ends 521-1 and 521-2 here is referred to as the module transport section 525 and corresponds to the maximum stroke of the reciprocating movement in the x-direction. Reciprocating movements with a shorter reciprocating stroke in the x-direction can also be implemented with the aid of the drive concept.

A reciprocating movement need not run over the entire module transport section 525. The reciprocating stroke of the actually utilized reciprocating movement runs between a first terminal position 522-1 of the reciprocating movement and the opposite second terminal position of the reciprocating movement.

A basic carrier 540, that supports a gripper arm 545 that has a rectangular profile and is displaceable horizontally in the y-direction, perpendicular to the module transport section, is fastened to the slide 521, the latter with the aid of the transport drive 530 being displaceable horizontally in the x-direction. The gripper arm on the end thereof that faces the front wall supports, for example, a pneumatically activatable mechanical gripper unit 560 for gripping a workpiece. The horizontal movement (transverse stroke) of the gripper arm running in the y-direction is generated with the aid of a drive 542 attached to the basic carrier of the transport unit 520 and conjointly with the latter can be displaced in the x-direction. A transport unit can be constructed, for example, with the aid of a suitably sized ready-to-install linear axis which is marketed under the name "Omegamodule" by the manufacturer Bosch Rexroth AG.

Figure 4:
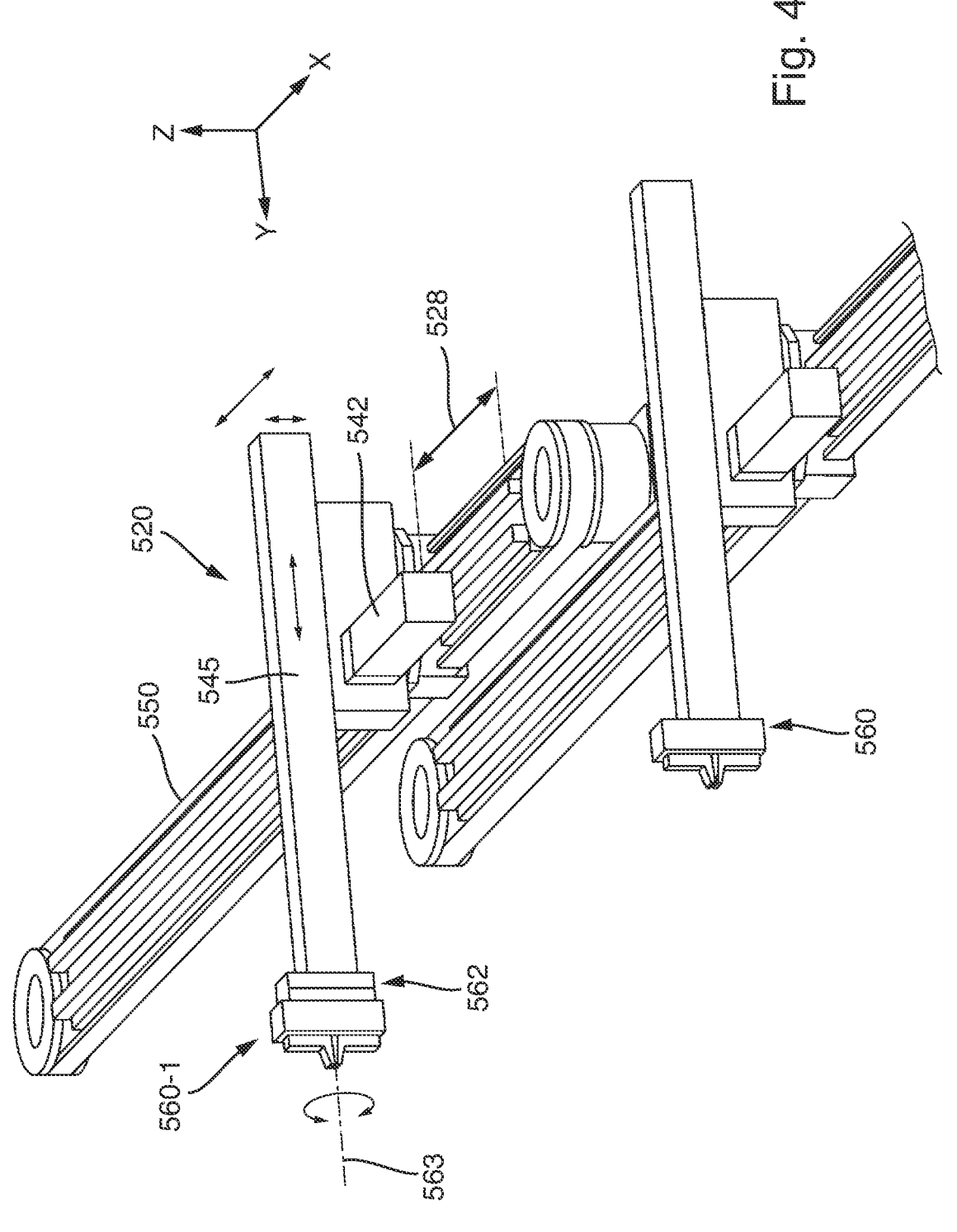
FIG. 4 shows a fragment of the transport system with two transport units, wherein one of the latter has a rotatable gripper unit.

Two different possibilities for attaching a gripper unit are illustrated in FIG. 4. In the front example, the gripper unit 560 is fixedly assembled on the horizontally displaceable gripper arm. In the example illustrated therebehind, the gripper unit 560-1 with the aid of a rotary group 562 installed between the gripper unit and the gripper arm is rotatable by 180° about a gripper unit rotation axis 563 oriented in the y-direction. The additional construction, or the additional length of this unit, respectively, in the y-direction can be compensated by the variable stroke in the y-direction.

The gripper arms are preferably height adjustable in a controlled manner. A pneumatic or servo-electric drive can each be provided for the functions "rotate" and "lift/lower," for example. These movements can be freely programmed by way of the control installation.

Figure 2:
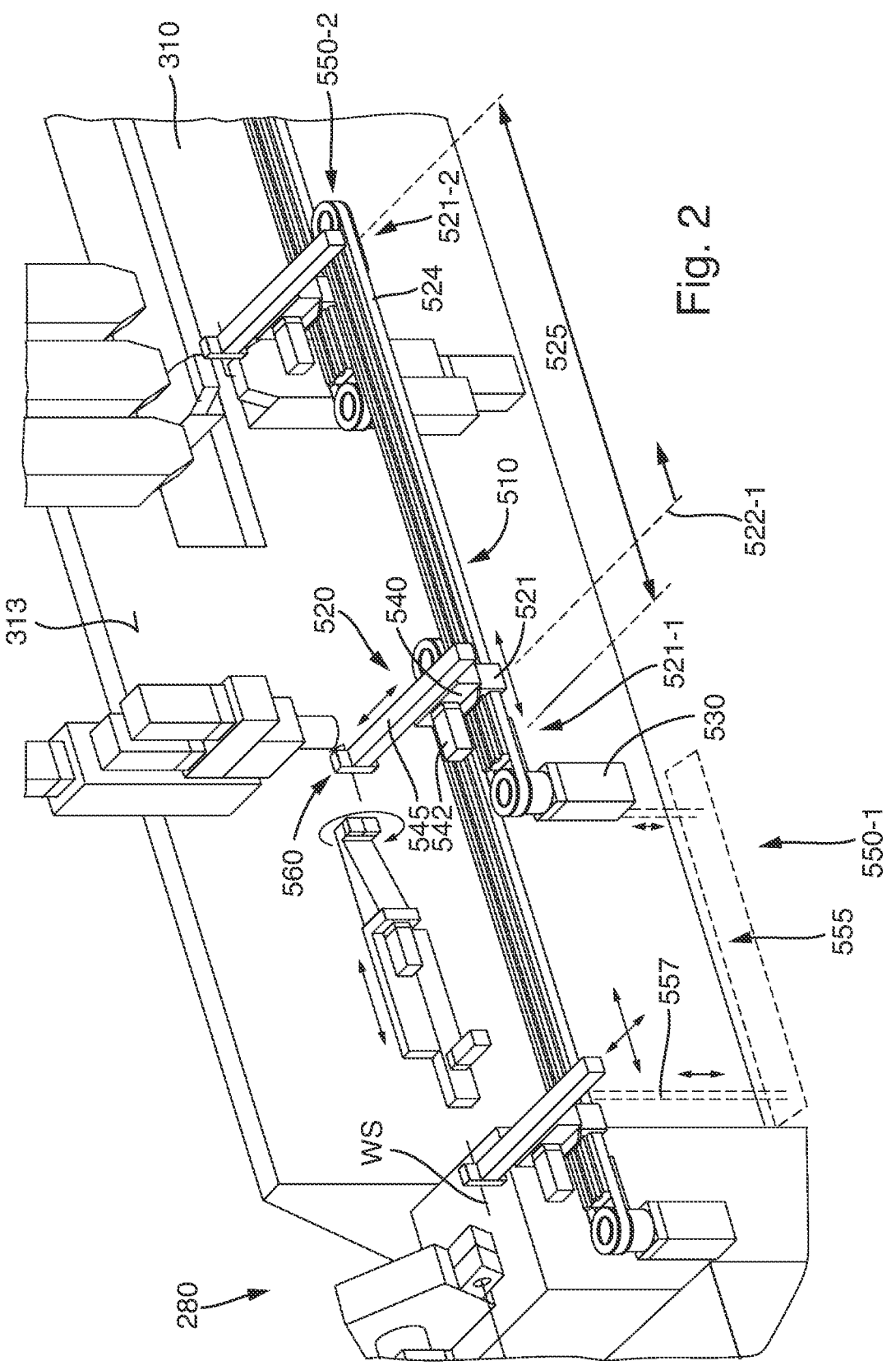
FIG. 2 shows a detail of the forming machine with part of the transport system of a modular construction.
Figures 3, 5:
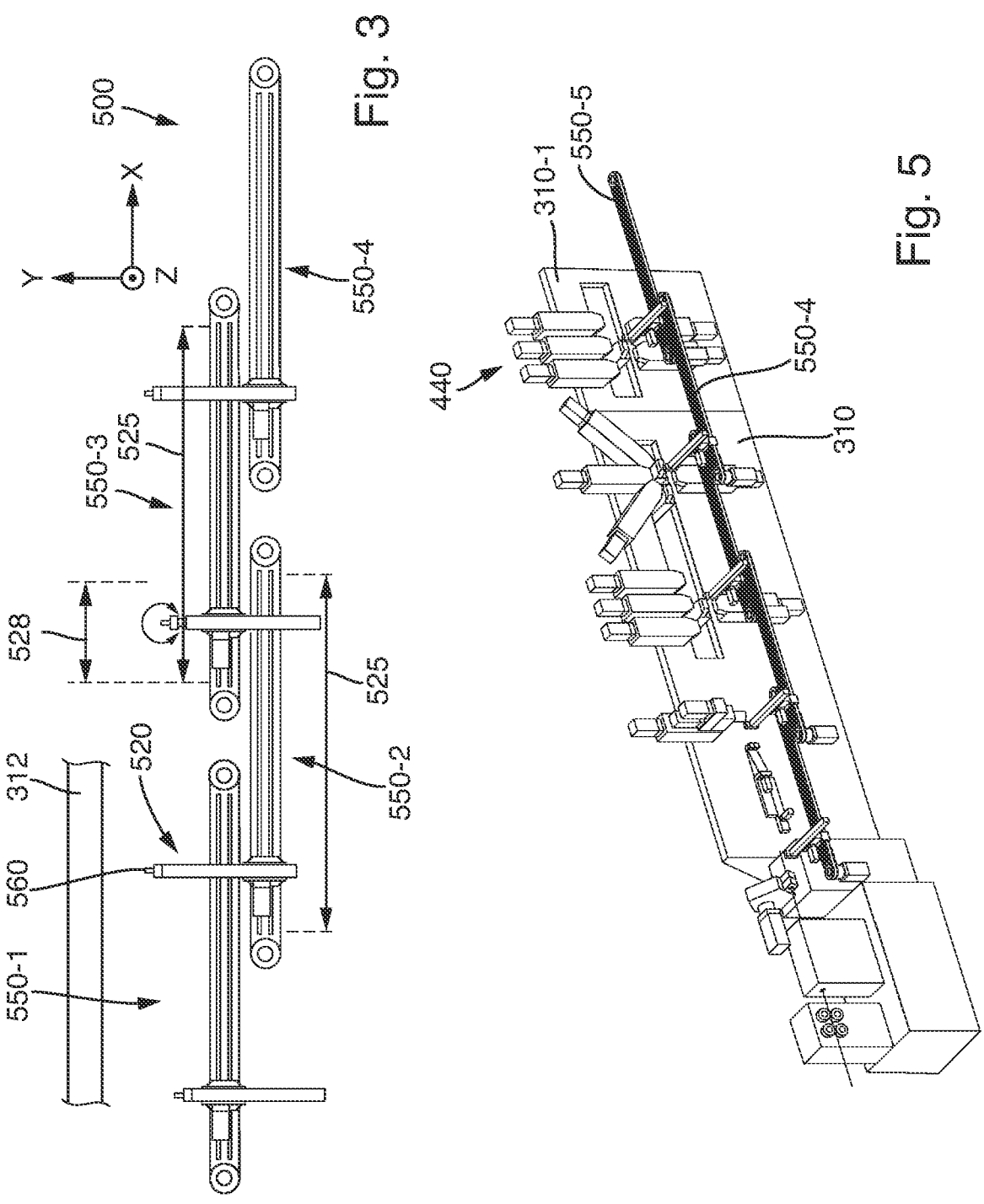
FIG. 3 shows a plan view from above of the transport system with four transport modules.
FIG. 5 shows a forming machine with an extension of the machine frame and a further transport module.

As can be particularly readily seen in FIGS. 2 and 3, the transport modules are disposed in two rows behind one another in the horizontal x-y-plane, wherein the first and the third transport module are disposed closer to the assembly wall 312, while the second and the fourth transport module are each disposed in the second row to be offset by a fraction of the module transport section in the x-direction and at a somewhat larger spacing from the assembly wall. The disposal in two rows with an offset in the primary transport direction results in that the transport sections of directly successive transport modules in the region of a workstation overlap within an overlap region 528. The length of the overlap region here can be up to almost half the length of the module transport section, for example, be between 20% and 40% of this length such that a relative wide region results in front of each workstation that can be approached by the transport unit of an upstream transport module as well as by the transport unit of the downstream transport module.

The transport system 500 of modular construction is highly flexible in terms of the manipulation potential. The stroke in the x-direction (primary transport direction or direction of the x-reciprocating movement) at each workstation is able to be controlled independently of the other workstations. The same applies to the stroke in the y-direction, the latter also being referred to as the transverse direction and implementing the movement of the gripper units towards the workstations and away from the latter. An overreaching stroke in the x-direction is possible at each workstation as a result of the mutual overlap of the reciprocating strokes of adjacent transport units.

There is also the possibility of managing a workstation from two different sides (in the x-direction). A bent component can be retrieved in the y-direction, rotated about the y-axis by a rotatable gripper (cf. FIG. 4), and moved once again toward the workstation in the y-direction. In the example, the possible movements provide that a component is offset in the y-direction, a component which has twice been slightly offset in the y-direction is fed in the x-direction, or is rotated about the y-axis and fed a second time.

In each transport module, the gripper unit thereof by virtue of the separate drives for the x-stroke and the y-stroke can be displaced flexibly in the x-direction and the y-direction independently of the gripper units of the other transport modules. This results in a high degree of flexibility in terms of the pitch between the workstations. "Pitch" here refers to the spacing between adjacent workstations, or the workpiece holding installations thereof, respectively, measured in the x-direction. In the configuration in FIG. 1, the pitch is uniform or constant. However, it is readily possible to provide other and/or non-uniform pitches. In principle, a machining station can be installed at each location of an overlap region between successive transport modules and be "managed" there. Exact positioning in the horizontal direction is not necessary because the transport units of the two transport modules responsible for the workstations by way of the controller can be displaced to any position within the module transport sections of the transport modules.

The concept is highly flexible not only in terms of different spacings between workstations. The forming machine can also be extended with further functionalities in a very simple manner (cf. FIG. 5). In the basic stage of expansion shown in FIG. 1, a machine frame 310 is present as the basic unit. If the machine is to be extended with further workstations, at least one further machine frame module 310-1 can be added (cf. FIG. 5). The first workstation of the further machine frame module 310-1, which in this instance forms the fourth forming station 440, is then approached by way of the fourth transport module 550-4, or the transport unit of the latter. Thereafter, a further transport module 550-5 can additionally be fitted to enable the dispatch or onward transportation to potential further machining stations.

The forming plant while under the control of the control unit 190 can operate as follows, for example. The converting machine 200 successively makes available straightened workpiece portions which with the aid of the cutting unit 280 are successively severed from the fed continuous material.

The gripper unit of the first transport module 550-1 can be gripped and firmly hold the workpiece portion to be severed before a next workpiece is severed, until the workpiece portion is severed from the fed workpiece material. Alternatively, the wire can also be cut and then made available to the gripper by way of a simple roller track, for example.

Thereafter, the gripper unit is retracted to the front by a negative y-stroke. Thereafter, or in a temporal overlap, the transport unit of the first transport module 550-1 conjointly with the gripped workpiece travels along the module transport section of the first transport module to the first forming station 410, the latter here being conceived as a bending station for pin-and-mandrel bending. The gripper then travels in the direction of the front wall up to a machining position of the workpiece. The workpiece can then be gripped by the manipulator 415 and be firmly held for a first bending operation. If a second bending operation in another bending plane is to be generated at the first forming station, the workpiece by the rotatable gripper of the manipulator 415 is correspondingly rotated and optionally displaced in the x-direction. Once the forming operations at the first forming station 410 have been completed, the gripper unit of the transport unit of the second transport module 550-2 travels forward and grips the workpiece. Upon retraction (negative y-stroke) the workpiece with the aid of a travelling movement in the x-direction is moved to the second forming station 420 and at the latter, by way of a positive y-stroke, moved to the machining position below the three bending slides. The optionally multi-stage forming operation there is then carried out by a coordinated actuation of the bending slides. The completely formed workpiece there is then gripped by the gripper unit of the transport unit of the third transport module 550-3, displaced forward, and then moved in the direction of the third forming station. The last forming operation is carried out there before the gripper of the fourth transport module 550-4 grips the completely formed workpiece and moves the latter in the direction of the rear end of the fourth transport module for dispatching.

All transport units 520 can operate simultaneously or with a temporal overlap, and thereby perform individual motion profiles. Once the first transport unit has transferred the straight workpiece to the first forming station, the first transport unit can return and grip the next workpiece at the loading station 400, while the preceding workpiece is being formed at the first forming station. Thereafter, the next workpiece is transported to the successive workstations in the sequence described. Not all transport units have to be permanently in motion. For example, it may be that re-clamping of the workpiece is also desirable at a workstation to carry out further forming operations at the latter. In the example of FIG. 3, the configuration is such, for example, that a non-rotatable gripper is attached to the transport units of the first, the second and the fourth transport module, while the gripper unit of the third transport module 550-3 is rotatable about a rotation axis running parallel to the y-direction. The forming operation of the third workstation can in this instance be carried out such, for example, that the workpiece is first offered up, moved to a machining position and formed. Thereafter, the third gripper unit can grip the workpiece, re-orientate the latter by rotating the gripper unit about its rotation axis, and move the workpiece once again to the machining position between the slides. The other transport units can at times be stationary during these operations. The cycle time is ultimately determined by the slowest forming operation at a workstation.

In terms of the transport possibilities, or the transfer, it can thus be provided in many configurations that (i) there is a mechanical initial position in the x-direction (primary transport direction) that may differ for the sub-systems, wherein the sub-systems in this instance may also overlap and, in a programmable manner, do not always have to be deployed by 100% of the displacement paths possible in terms of construction;

(ii) different strokes in the y-direction may be programmed, that can also take place multiple times, for example, twice at one station;

(iii) wherein the displacement profile can be programmed between "angular" and "round" and moreover with variable acceleration and velocity; and (iv) the grippers at the end of the stroke can moreover enter the forming station "from the left" or "from the right."

Figures 6A, 6B, 6C, 6D, 6E, 6F:
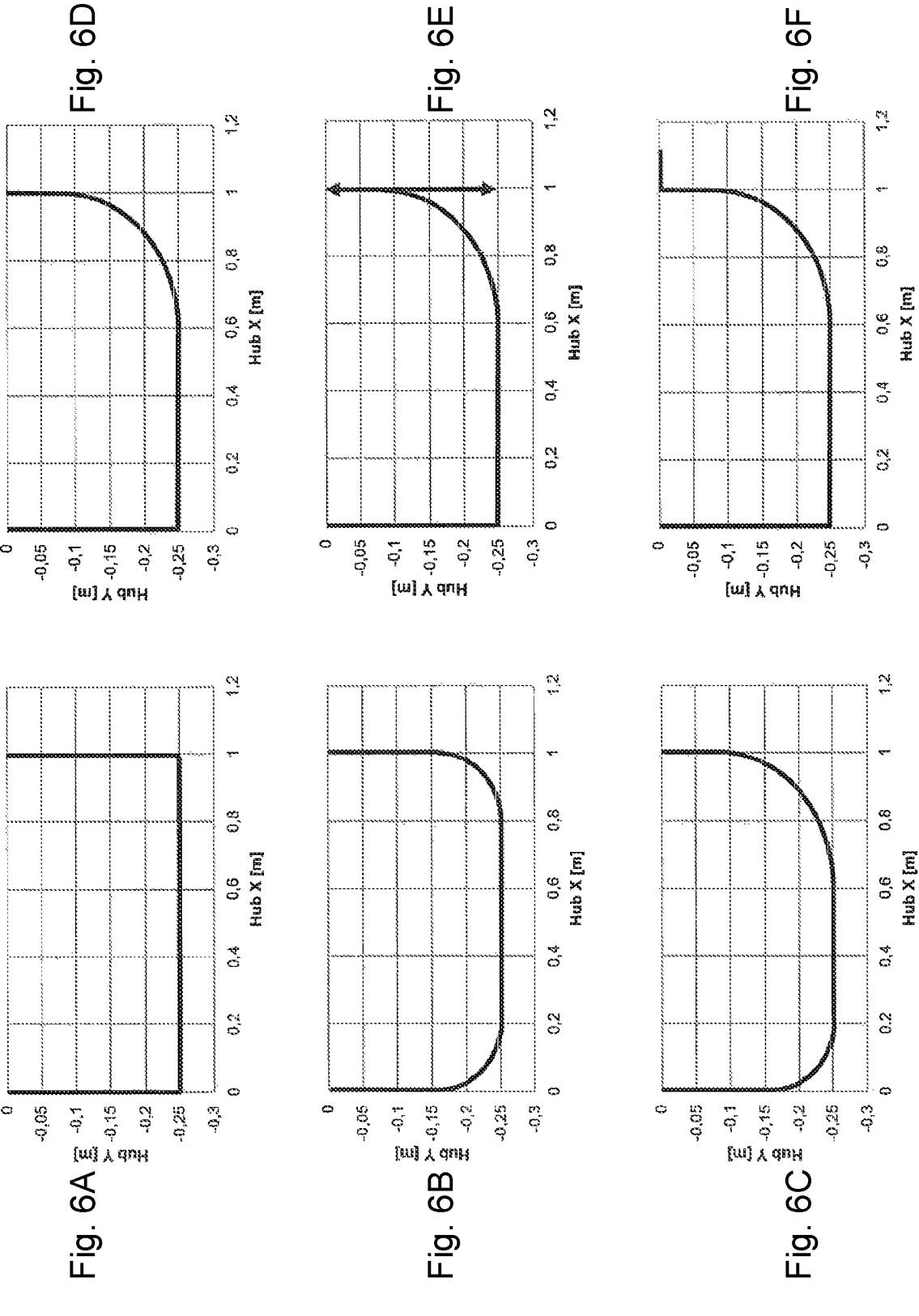
FIGS. 6A to 6F show different examples of individual motion profiles for the strokes in the x-direction and in the y-direction.

Different examples of potential motion profiles, or displacement profiles, that result from the associated stroke paths in the x-direction ("stroke x," cf. abscissa of the diagrams) and in the y-direction ("stroke y," cf. ordinate of the diagrams), to visualize potential individual motion profiles and the potential combinations thereof are shown in FIG. 6A to 6F. In the "angular" displacement profile in FIG. 6A, the y-strokes and the x-stroke are performed in a temporally sequenced manner. In the "round 1" displacement profile in FIG. 6B the x-stroke starts in the final phase of the first y-stroke so that a radiused displacement profile results. The same applies in an analogous manner to the end of the x-movement. The "round 2" displacement profile in FIG. 6C visualizes that the velocity ratios between the x-stroke and the y-stroke may differ in phases of simultaneous activation. FIG. 6D shows the "mixed" displacement profile. The displacement profile FIG. 6E visualizes that the gripper at the end travels to the assigned machining station up to two times. In the displacement profile in FIG. 6F, the gripper at the end of the second y-stroke still travels a distance in the x-direction to be able to introduce the workpiece into the forming station.

The forming machine can be easily reconfigured and expanded in that, in addition to the transport modules present in the basic configuration (four transport modules in the example), one or a plurality of further transport modules are assembled on the basic unit of the machine frame or on an expansion unit so that the transport section overall is lengthened. To this end, FIG. 5 shows an optional additional fifth transport module 550-5, the transport unit thereof acquiring the workpiece at the fourth forming station and transporting the workpiece onward.

In the example, the plant is specified to process wire material with a round cross section (round stock), which in the form of straight wire rods is transferred to the forming machine. Flat stock may also be processed.

Other examples operate with straight workpieces that have already been cut to the required length. In those examples, a bunker conveyor or any other installation that provides the prefabricated straight workpieces in a sorted manner to the loading station can be provided instead of the converting machine. Blanks that are not mandatorily straight may also be fed but the initial workpiece in terms of the longitudinal extent thereof will typically be largely straight. Pre-machined initial workpieces can also be moved to the forming machine, thus such workpieces in which machining operations have already taken place, thus workpieces with flutes, threads, knurls, tapers, bores and/or stampings, for example.

The forming machine is suitable to start with substantially straight blanks. In principle, it is also possible to start using an already bent initial workpiece, or a non-straight workpiece which has been pre-machined in another way.

A formed part can also be modified by adding material during the production of the final product. The joining can take place by forming, for example, by riveting, clinching, flanging, or by embossing a separated piece, for example, a piece of sheet metal, onto the formed part, optionally also by welding material to the formed part.

The task of a transport module can be implemented by a single multi-axis robot if required. When using a multi-axis robot for transporting and/or manipulating a workpiece between workstations of a multi-station machining tool, there are largely no restrictions in terms of the motion sequence, also in the z-direction, and it may be easier to offer somewhat more available space during retooling. However, this solution requires significantly more space when using systems available today, tends to be overly large in terms of dimensions, substantially more expensive due to the required operating range, difficult in terms of safety, and also difficult in terms of synchronization (or at least slower). In contrast, transport modules of the type shown in the examples are adapted to the transport tasks, can be provided in the relatively cost-effective manner, and permit the construction of a compact, efficient transport system for transporting workpieces in a multi-station forming machine.

The invention claimed is:

1. A forming machine that produces formed parts of a complex design from straight workpieces from wire or tube, comprising:
  a computerized numerical control unit;
  a plurality of workstations comprising a loading station, a first machining station downstream of the loading station, and at least one second machining station downstream of the first machining station, wherein at least two of the machining stations are forming stations;
  a transport system that transports successive workpieces from the loading station to downstream workstations while under control by the control unit,
wherein
  the transport system is of a modular construction and comprises a plurality of transport modules, and each of the transport modules is assigned to two mutually successive workstations and comprises:
  a support structure;
  a transport unit supported by the support structure, and while under control by the control unit by way of an individual motion profile in a shuttle operation is movable in a reciprocating manner along a module transport section of the transport module, between a first terminal position and a second terminal position of a reciprocating stroke; and
  a gripper unit that grips a workpiece.

2. The forming machine according to claim 1, further comprises another forming machine comprising a machine frame having an assembly wall which on a front side has flexibly utilizable assembly structures with a plurality of assembly grooves and/or assembly bores that assemble tool-carrying machining units to form the workstations, wherein the assembly wall is preferably of a modular construction and extendable by assembly wall modules.

3. The forming machine according to claim 2, wherein the transport modules are assembled independently of the assembly wall, and the transport modules are fastened on the floor or on a basic carrier not suspended on the assembly wall or connected to the latter, or the transport modules are assembled on the machine frame or on the front side of the assembly wall.

4. The forming machine according to claim 2, wherein the transport modules by a height adjustment are able to be lowered such that free access to the assembly wall and equipping the machining stations is possible.

5. The forming machine according to claim 1, wherein a transport unit has a basic carrier movable along the module transport section or supports a gripper arm transversely perpendicularly displaceable to the module transport section and supports a gripper unit assembled on the gripper arm, and the base carrier supports a drive which, to move the gripper arm, is actuatable by the control unit.

6. The forming machine according to claim 5, wherein in at least one of the transport units the gripper unit is mounted on the gripper arm to be rotatable about a gripper unit rotation axis, and/or in that in at least one of the transport units the gripper unit is height adjustable in relation to the basic carrier.

7. The forming machine according to claim 1, wherein the gripper unit is configured as a mechanical gripper unit that mechanically grips a workpiece, or as magnetic gripper unit.

8. The forming machine according to claim 1, wherein the module transport section runs between a first end and a second end, and in that the control unit is configured or able to be configured so that the first terminal position of the reciprocating stroke lies at a spacing from the first end of the module transport section, and/or the second terminal position of the reciprocating stroke lies at a spacing from the second end of the module transport section so that the reciprocating stroke is shorter than the module transport section.

9. The forming machine according to claim 1, wherein a transport module for moving the transport unit along the module transport section has a module-specific drive system having a transport drive supported by the support structure and actuatable by the control unit.

10. The forming machine according to claim 1, wherein the transport module is disposed in two rows to be mutually offset such that module transport sections of directly successive transport modules on a workstation overlap in an overlap region.

11. A forming plant that produces complexly bent formed parts from wire or tube, comprising:
  an installation that provides straight workpieces of definable length from wire material or tubular material; and the forming machine according to claim 1, downstream of the installation, that produces complexly bent formed parts from the straight workpieces.

12. The forming plant according to claim 11, wherein the installation has a converting machine that produces the straight workpieces from workpiece material, and the converting machine has an infeed installation that feeds workpiece material from a material supply, a straightening installation that straightens the workpiece material, and a cutting installation that severs straightened workpiece portions from the supplied workpiece material.

\* \* \* \* \*